(12) United States Patent
Kashima et al.

(10) Patent No.: US 10,450,226 B2
(45) Date of Patent: *Oct. 22, 2019

(54) CHEMICALLY STRENGTHENED GLASS

(71) Applicant: AGC Inc., Chiyoda-ku (JP)

(72) Inventors: Izuru Kashima, Tokyo (JP); Yusuke Fujiwara, Tokyo (JP); Kiyoshi Tamai, Tokyo (JP); Yuichi Suzuki, Tokyo (JP); Daisuke Kobayashi, Tokyo (JP); Yoichi Sera, Tokyo (JP); Taku Yamada, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 53 days.

This patent is subject to a terminal disclaimer.

(21) Appl. No.: 15/818,016

(22) Filed: Nov. 20, 2017

(65) Prior Publication Data

US 2018/0072619 A1 Mar. 15, 2018

Related U.S. Application Data

(63) Continuation of application No. 15/000,918, filed on Jan. 19, 2016, now Pat. No. 9,884,784, which is a (Continued)

(30) Foreign Application Priority Data

Jul. 19, 2013 (JP) ................................ 2013-151116

(51) Int. Cl.
*C03C 21/00* (2006.01)
*G01B 5/28* (2006.01)
(Continued)

(52) U.S. Cl.
CPC ............ *C03C 21/002* (2013.01); *C03C 3/085* (2013.01); *C03C 3/087* (2013.01); *C03C 3/091* (2013.01);
(Continued)

(58) Field of Classification Search
CPC ...... C03C 21/002; C03C 21/006; C03C 15/00; C03C 23/0075; C03C 3/085; C03C 3/091; C03C 3/087; G01B 5/28
See application file for complete search history.

(56) References Cited

U.S. PATENT DOCUMENTS 7,140,203 B2 * 11/2006 Saito ....................... C03C 15/00
65/30.14
8,642,175 B2 2/2014 Hashimoto et al.
(Continued)

FOREIGN PATENT DOCUMENTS

CN 102432171 A 5/2012
CN 102583966 A 7/2012
(Continued)

OTHER PUBLICATIONS

International Search Report dated Oct. 21, 2014 in PCT/JP2014/068836, filed Jul. 15, 2014 (with English Translation).
(Continued)

*Primary Examiner* — David Sample
*Assistant Examiner* — Donald M Flores, Jr.
(74) *Attorney, Agent, or Firm* — Oblon, McClelland, Maier & Neustadt, L.L.P.

(57) ABSTRACT

A chemically strengthened glass having a compressive stress layer formed in a surface layer thereof according to an ion exchange method, in which the glass has a surface roughness (Ra) of 0.20 nm or higher, a hydrogen concentration Y in a region to a depth X from an outermost surface of the glass satisfies the following relational equation (I) at X=from 0.1 to 0.4 (μm), a surface strength F (N) measured by a ball-on-ring test under the following conditions is $(F \geq 1500 \times t^2)$ relative to a sheet thickness t (mm) of the glass, and a surface of the glass has no polishing flaw:

$$Y = aX + b \qquad (I)$$

(Continued)

in which meanings of respective symbols in the equation (I) are as follows: Y: hydrogen concentration (as $H_2O$, mol/L); X: depth from the outermost surface of the glass (μm); a: −0.270 to −0.005; and b: 0.020 to 0.220.

16 Claims, 14 Drawing Sheets

Related U.S. Application Data continuation of application No. PCT/JP2014/068836, filed on Jul. 15, 2014.

(51) Int. Cl.
- *C03C 23/00* (2006.01)
- *C03C 3/085* (2006.01)
- *C03C 3/091* (2006.01)
- *C03C 3/087* (2006.01)
- *C03C 15/00* (2006.01)

(52) U.S. Cl.
CPC ............ *C03C 15/00* (2013.01); *C03C 21/006* (2013.01); *C03C 23/0075* (2013.01); *G01B 5/28* (2013.01)

(56) References Cited

U.S. PATENT DOCUMENTS

| | | | |
|---|---|---|---|
| 8,785,010 B2 | 7/2014 | Eda et al. | |
| 8,813,520 B2 | 8/2014 | Hashimoto et al. | |
| 8,889,254 B2 | 11/2014 | Bayne et al. | |
| 8,919,150 B2 | 12/2014 | Imai et al. | |
| 8,974,561 B2 | 3/2015 | Tamaki et al. | |
| 9,085,486 B2 | 7/2015 | Eda et al. | |
| 9,096,463 B2 | 8/2015 | Hashimoto et al. | |
| 9,884,784 B2 * | 2/2018 | Kashima | C03C 21/002 |
| 2002/0121110 A1 | 9/2002 | Saito et al. | |
| 2003/0079500 A1 | 5/2003 | Umeyama | |
| 2003/0164005 A1 | 9/2003 | Saito et al. | |
| 2003/0230552 A1 | 12/2003 | Jensen et al. | |
| 2004/0221615 A1 | 12/2004 | Postupack et al. | |
| 2009/0197048 A1 | 8/2009 | Amin et al. | |
| 2010/0167059 A1 | 7/2010 | Hashimoto et al. | |
| 2011/0165393 A1 | 7/2011 | Bayne et al. | |
| 2011/0171415 A1 | 7/2011 | Eda et al. | |
| 2011/0195279 A1 | 8/2011 | Saeki et al. | |
| 2012/0208028 A1 | 8/2012 | Hashimoto et al. | |
| 2013/0061636 A1 | 3/2013 | Imai et al. | |
| 2013/0083425 A1 | 4/2013 | Tamaki et al. | |
| 2014/0248495 A1 | 9/2014 | Matsuda et al. | |
| 2014/0287269 A1 | 9/2014 | Eda et al. | |
| 2014/0342146 A1 | 11/2014 | Hashimoto et al. | |
| 2015/0052949 A1 | 2/2015 | Bayne et al. | |
| 2015/0158139 A1 | 6/2015 | Tamaki et al. | |
| 2015/0291467 A1 | 10/2015 | Miura et al. | |
| 2016/0130178 A1 | 5/2016 | Kashima et al. | |

FOREIGN PATENT DOCUMENTS

| | | |
|---|---|---|
| CN | 102992600 | 3/2013 |
| JP | 2001-2451 | 1/2001 |
| JP | 2002-150547 | 5/2002 |
| JP | 2008-195602 | 8/2008 |
| JP | 2010-108592 | 5/2010 |
| JP | 2010-168270 | 8/2010 |
| JP | 2011-510904 | 4/2011 |
| JP | 2012-236737 | 12/2012 |
| JP | 2012-250861 | 12/2012 |
| JP | 2013-40086 | 2/2013 |
| JP | 2013-84337 | 5/2013 |
| JP | 2013-516387 | 5/2013 |
| JP | 5720866 | 5/2015 |
| TW | 201329000 A1 | 7/2013 |
| WO | WO 2008/062662 A1 | 5/2008 |
| WO | WO 2013/035840 A1 | 3/2013 |
| WO | WO 2015/008763 A1 | 1/2015 |

OTHER PUBLICATIONS

Written Opinion dated Oct. 21, 2014 in PCT/JP2014/068836, filed Jul. 15, 2014.
International Search Report dated Oct. 21, 2014 in PCT/JP2014/068832, filed Jul. 15, 2014 (with English Translation).
International Search Report dated Oct. 21, 2014 in PCT/JP2014/068834, filed Jul. 15, 2014 (with English Translation).
S. Ito et al. "Crack Blunting of High-Silica Glass", Journal of the American Ceramic Society, vol. 65, No. 8, 1982, 2 pages.
Won-Taek Han et al. "Effect of Residual Water in Silica Glass on Static Fatigue", Journal of Non-Crystalline Solids, vol. 127, 1991, 5 pages.
Office Action dated Jan. 11, 2017, in co-pending U.S. Appl. No. 15/000,675.

* cited by examiner

CHEMICALLY STRENGTHENED GLASS

CROSS-REFERENCE TO RELATED APPLICATIONS

The present application is a continuation application of U.S. patent application Ser. No. 15/000,918, Jan. 19, 2016, which is in turn a continuation of PCT Application No. PCT/JP2014/068836, filed on Jul. 15, 2014, which is based upon and claims the benefit of priority from Japanese Patent Application No. 2013-151116 filed on Jul. 19, 2013. The contents of those applications are incorporated herein by reference in their entireties.

TECHNICAL FIELD

The present invention relates to a chemically strengthened glass.

BACKGROUND ART

In flat panel display devices such as digital cameras, mobile phones, personal digital assistants (PDAs), etc., in order to protect displays and enhance the appearance thereof, a thin plate-like cover glass is disposed on the front surface of the display so as to provide a broader region than an image display portion. Although the glass has a high theoretical strength, when scratched, its strength is largely lowered, and therefore, for the cover glass that is required to satisfy strength, a chemically strengthened glass having a compressive stress layer formed on the surface thereof through ion exchange or the like is used.

With the growing demand for weight reduction and thickness reduction in flat panel display devices, it is desired to thin cover glass itself. Accordingly, for satisfying the purpose, both the surfaces and the edge surfaces of cover glass are desired to have further strength.

For increasing the strength of the chemically strengthened glass, heretofore, a surface etching treatment to be conducted after chemical strengthening treatment is known (Patent Document 1).

Here, regarding the strength of glass, it is known that the strength of glass is lowered by the existence of hydrogen (water) in glass (Non-Patent Documents 1 and 2).

BACKGROUND ART DOCUMENT

Patent Document

Patent Document 1: JP-T-2013-516387

Non-Patent Document

Non-Patent Document 1: S. ITO et. al., "Crack Blunting of High-Silica Glass", Journal of the American Ceramic Society, Vol. 65, No. 8, (1982), 368-371

Non-Patent Document 2: Won-Taek Han et. al., "Effect of residual water in silica glass on static fatigue", Journal of Non-Crystalline Solids, 127, (1991) 97-104

SUMMARY OF THE INVENTION

Problems that the Invention is to Solve

The present inventors have found that there is a concern that the strength of glass is lowered after the chemical strengthening, and the major cause thereof is that moisture in the atmosphere penetrates into the glass surface layer to form chemical defects. Further, the present inventors have found that this phenomenon occurs not only through chemical strengthening but also through a heating step in glass production process.

As a technique for removing moisture from a glass surface layer, it may be considered to chip off the moisture-containing layer according to a technique of polishing the glass surface after chemical strengthening or according to a technique of subjecting the glass surface after chemical strengthening to an etching treatment by immersing in hydrofluoric acid or the like. However, there is a concern that the surface of glass is scratched by polishing so that the strength thereof rather lowers. In addition, in a case where the glass surface has latent flaws, there is a concern that the etching treatment using hydrofluoric acid or the like grows the latent flaws to cause appearance failure owing to pits. Further, hydrofluoric acid requires careful handling in view of safety.

An object of the present invention is to provide a chemically strengthened glass capable of effectively preventing the strength of glass from lowering even after performing chemical strengthening.

Means for Solving the Problems

The present inventors have found that by not only allowing a hydrogen concentration profile on a surface layer of a chemically strengthened glass to fall within a specific range but also controlling a surface roughness (Ra) to a specific value or higher, the surface strength of glass can be dramatically improved and a reliability of the surface strength can be improved, without polishing the glass surface after chemical strengthening or subjecting the glass surface after chemical strengthening to the etching treatment using hydrofluoric acid or the like, thereby accomplishing the present invention.

Namely, the present invention is as shown below.

<1> A chemically strengthened glass having a compressive stress layer formed in a surface layer thereof according to an ion exchange method, in which the glass has a surface roughness (Ra) of 0.20 nm or higher, a hydrogen concentration Y in a region to a depth X from an outermost surface of the glass satisfies the following relational equation (I) at X=from 0.1 to 0.4 (μm), a surface strength F (N) measured by a ball-on-ring test under the following conditions is ($F \geq 1500 \times t^2$) relative to a sheet thickness t (mm) of the glass, and a surface of the glass has no polishing flaw:

$$Y = aX + b \tag{I}$$

in which meanings of respective symbols in the equation (I) are as follows:

Y: hydrogen concentration (as $H_2O$, mol/L);
X: depth from the outermost surface of the glass (μm);
a: −0.270 to −0.005; and
b: 0.020 to 0.220, the conditions of the ball-on-ring test:

a sheet of the glass having the sheet thickness t (mm) is disposed on a stainless ring whose diameter is 30 mm and whose contact part has a roundness with a curvature radius of 2.5 mm; while a steel ball having a diameter of 10 mm is kept in contact with the sheet of the glass, a center of the ring is subjected to a load by the ball under a static loading condition; and a fracture load (unit: N) at which the glass is fractured is taken as a BOR surface strength and an average value of twenty measured values thereof is taken as the surface strength F, provided that in a case where a fracture origin of the glass is separated from a loading point of the ball by 2 mm or more, the obtained value is excluded from data for calculating the average value.

<2> The chemically strengthened glass according to <1>, in which the glass is an aluminosilicate glass, an aluminoborosilicate glass or a soda-lime glass.

Advantage of the Invention

According to the chemically strengthened glass of the invention, by not only allowing a hydrogen concentration profile on a surface layer of a chemically strengthened glass to fall within a specific range but also controlling a surface roughness (Ra) to a specific value or higher; the surface strength of glass can be dramatically improved and a reliability of the surface strength can be improved, without polishing the glass surface after chemical strengthening.

MODE FOR CARRYING OUT THE INVENTION

Figure 1:
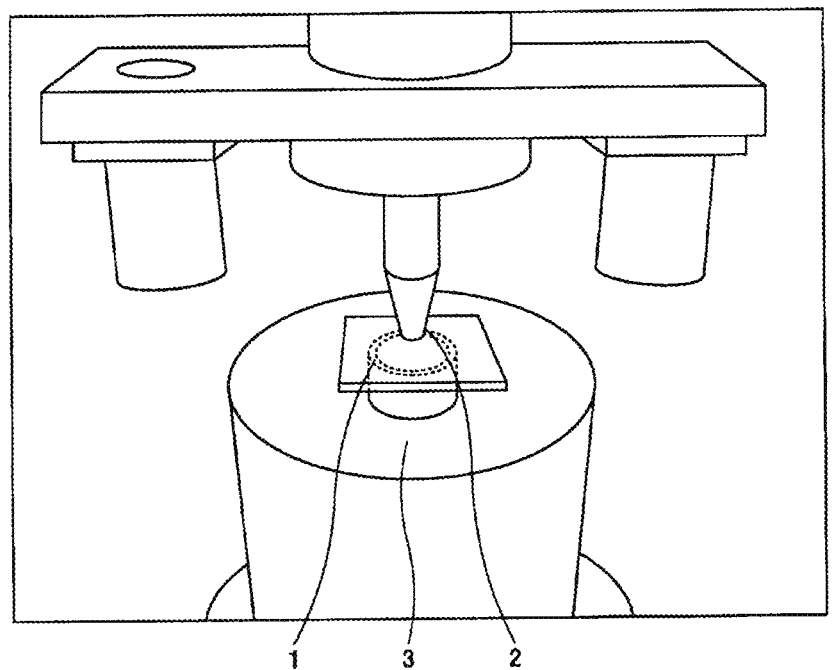
FIG. 1 is a schematic view for explaining a method of a ball-on-ring test.

The present invention is hereunder described in detail, but it should not be construed that the present invention is limited to the following embodiments, and the present invention may be arbitrarily modified and carried out within the range where the gist of the present invention is not deviated.

Here, in the present specification, "% by mass" has the same meaning as that of "% by weight", and "ppm by mass" has the same meaning as that of "ppm by weight". Simple expression of "ppm" indicates "ppm by weight".

<Chemically Strengthened Glass>

The chemically strengthened glass according to the present invention is a chemically strengthened glass having a compressive stress layer formed in the surface layer thereof according to an ion exchange method, in which the hydrogen concentration in the region to a certain depth from the outermost surface of the glass satisfies the following relational equation (I), and the glass surface has no polishing flaw.

The compressive stress layer is a high-density layer formed through ion exchange of the Na ion in a glass surface with the K ion in a molten salt by bringing a starting material glass into contact with an inorganic molten salt such as potassium nitrate.

In the chemically strengthened glass of the present invention, the hydrogen concentration profile in the glass surface layer falls within a specific range. Specifically, the hydrogen concentration Y in a region to a depth X from the outermost surface of the glass satisfies the following relational equation (I) at X=from 0.1 to 0.4 ($\mu m$).

$$Y=aX+b \quad (I)$$

[In the equation (I), the meanings of the respective symbols are as follows:

Y: hydrogen concentration (as $H_2O$, mol/L);

X: depth from the outermost surface of glass ($\mu m$);

a: −0.270 to −0.005; and b: 0.020 to 0.220]

Regarding the surface strength of a glass, it is known that the surface strength of a glass lowers owing to the presence of hydrogen (moisture) in the glass, but the present inventors have found that there is a concern that the surface strength of glass is lowered after the chemical strengthening treatment, and the major cause thereof is that moisture in the atmosphere penetrates into the glass to form chemical defects. Further, the present inventors have found that this phenomenon occurs not only through the chemical strengthening but also through a heating step in glass production process.

When the hydrogen concentration in a glass is high, hydrogen penetrates into the Si—O—Si bond network in the glass in the form of Si—OH whereby the bond of Si—O—Si is cut. When the hydrogen concentration in the glass is high, it is considered that the part where the Si—O—Si bond is cut increases so that chemical defects may be easily formed, whereby the surface strength is lowered.

The above-mentioned relational equation (I) holds in a region of from the outermost surface to a depth X=from 0.1 to 0.4 $\mu m$. The thickness of the compressive stress layer to be formed through ion exchange falls within a range of from 5 to 50 $\mu m$, though it depends on the degree of chemical strengthening. The hydrogen penetration depth into glass follows the diffusion coefficient, temperature and time, and the hydrogen penetration amount is influenced by the moisture amount in the atmosphere in addition to these. The hydrogen concentration after chemical strengthening is the highest in the outermost layer and gradually reduces toward the deep part (bulk) where the compressive stress layer is not formed. The above-mentioned relational equation (I) defines the profile of the reduction, and in the outermost surface (X=0 μm), there is a possibility that the moisture concentration may vary owing to time-dependent degradation, and therefore the equation is defined to hold in a region of the near surface (X=from 0.1 to 0.4 μm) not influenced by the variation.

In the equation (I), a indicates an inclination to define the profile of reduction in the hydrogen concentration. The range of a is from −0.270 to −0.005, preferably from −0.240 to −0.030, more preferably from −0.210 to −0.050.

In the equation (I), b corresponds to the hydrogen concentration in the outermost surface (X=0 μm). The range of b is from 0.020 to 0.220, preferably from 0.020 to 0.215, more preferably from 0.030 to 0.210, further preferably from 0.040 to 0.200.

In general, the surface strength reduction of a glass is considered to be caused by growth of microcracks existing in the glass surface owing to the mechanical stress given thereto from the outside. According to Non-Patent Document 2, when the glass structure at the tip of a crack is in a Si—OH-richer state, it is considered that the cracks easily grow. Assuming that the tips of cracks are exposed out in the atmosphere, the Si—OH amount in the tip of the crack is presumed to have a positive relationship to the hydrogen concentration in the glass outermost surface. Accordingly, b corresponding to the hydrogen concentration in the outermost surface preferably falls within a low range to the degree as shown above.

Figure 3:
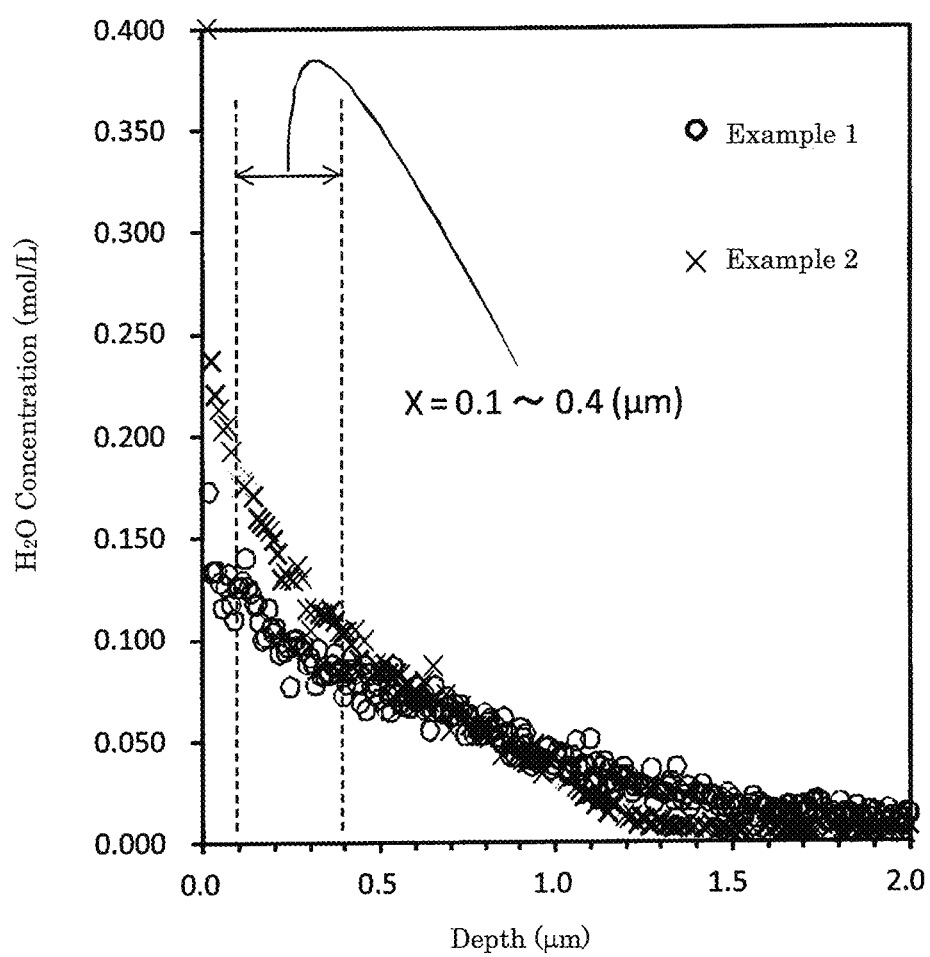
FIG. 3 is a graph of plotting the hydrogen concentration profile in the surface layer of each chemically strengthened glass obtained in Examples 1 and 2.
Figure 4:
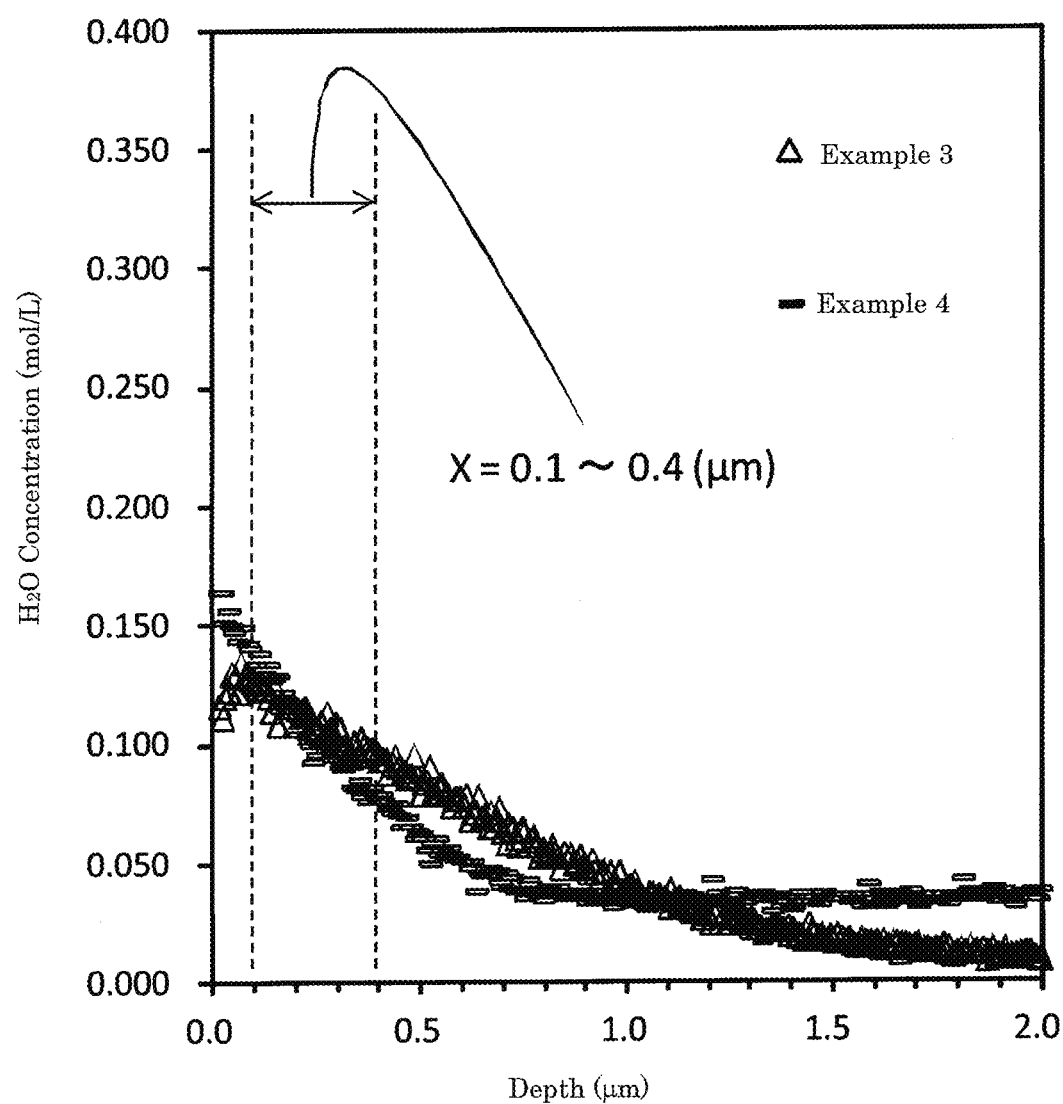
FIG. 4 is a graph of plotting the hydrogen concentration profile in the surface layer of each chemically strengthened glass obtained in Examples 3 and 4.
Figure 5:
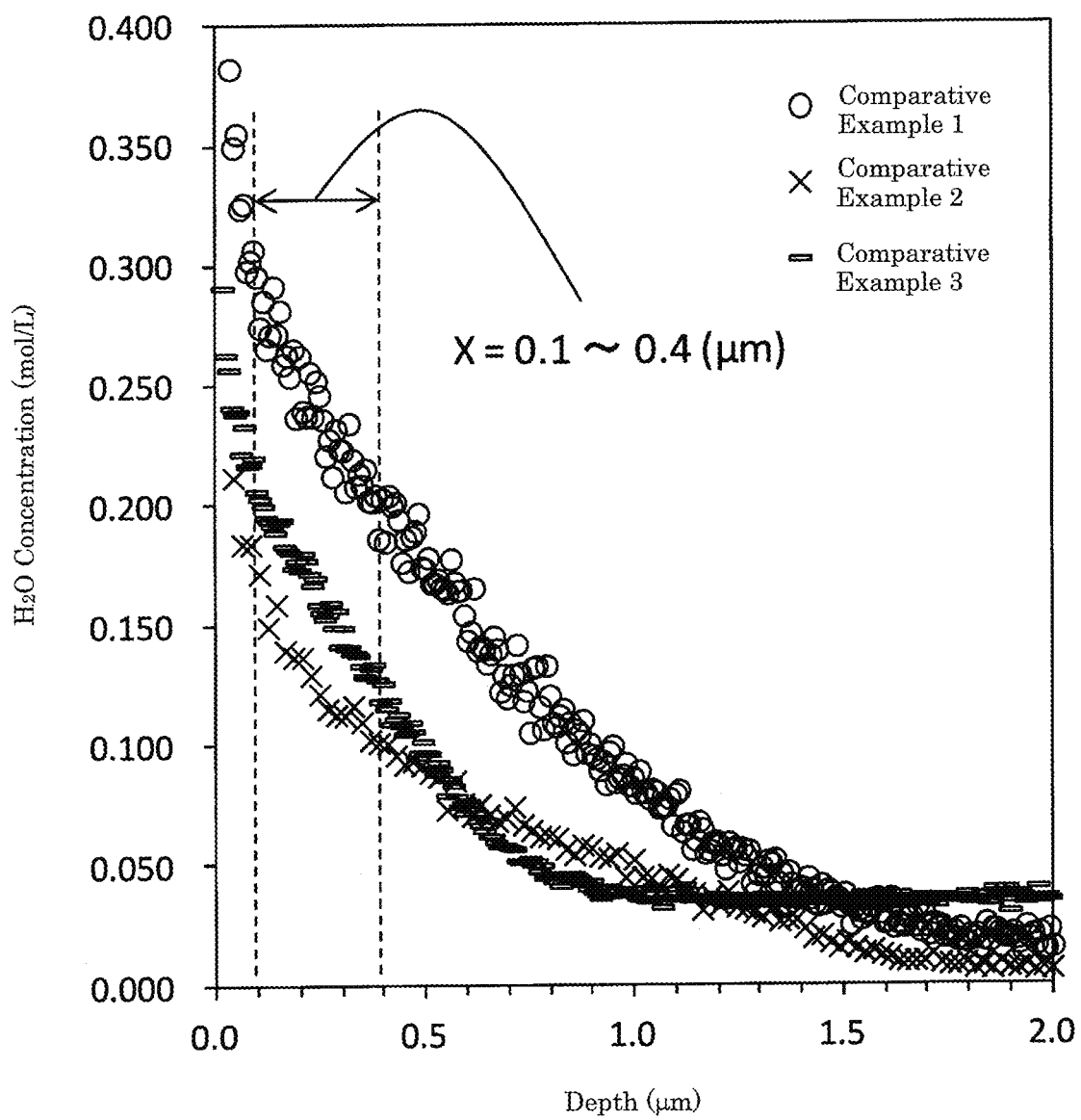
FIG. 5 is a graph of plotting the hydrogen concentration profile in the surface layer of each chemically strengthened glass obtained in Comparative Examples 1, 2 and 3.

As shown in FIGS. 3 to 5, the glass processed through a chemical strengthening step did not show any remarkable difference in the hydrogen penetration depth. There is a possibility that the hydrogen penetration depth may vary depending on the condition of the chemical strengthening step, but if the depth does not change at all, there appears a negative correlation between b that corresponds to the hydrogen concentration in the outermost surface and a that corresponds to the inclination to define the profile of reduction in the hydrogen concentration. Accordingly, a preferably falls within a high range to a degree as shown above.

As described above, in the present invention, it has been found that, not only by defining the hydrogen concentration itself alone in the surface layer but also by defining the hydrogen concentration in the surface layer and the reduction profile thereof each to fall within a specific range, with taking particular note of the hydrogen concentration profile, the surface strength of chemically strengthened glass can be greatly improved.

[Method for Measuring Hydrogen Concentration Profile]

Here, the hydrogen concentration profile ($H_2O$ concentration, mol/L) of a glass is a profile measured under the following analysis condition.

For measurement of the hydrogen concentration profile of a glass substrate, a method of secondary ion mass spectrometry (SIMS) is employed. In a case where a quantitative hydrogen concentration profile is obtained through SIMS, a standard sample whose hydrogen concentration is known is necessary. A method for preparing the standard sample and a method for determination of the hydrogen concentration thereof are described below.

1) A part of the glass substrate to be analyzed is cut out.
2) A region of 50 μm or more from the surface of the thus-cut glass substrate is removed by polishing or chemical etching. The removal treatment is carried out on both surfaces. Namely, the thickness to be removed on both surfaces is 100 μm or more. The glass substrate that has been subjected to the removal treatment is used as a standard sample.
3) The standard sample is analyzed through infrared spectroscopy (IR), and the absorbance height $A_{3550}$ at the peak top near 3,550 $cm^{-1}$ in the IR spectrum and the absorbance height $A_{4000}$ (base line) at 4,000 $cm^{-1}$ are determined.
4) The thickness d (cm) of the standard sample is measured using a thickness measuring device such as a micrometer.
5) With reference to the reference A, the hydrogen concentration (as $H_2O$, mol/L) in the standard sample is determined using the formula II, in which the infrared practical absorbance index of $H_2O$ in glass $\varepsilon_{pract}$ (L/(mol·cm)) is 75.

Hydrogen concentration in standard sample=$(A_{3550}-A_{4000})/(\varepsilon_{pract} \cdot d)$  Formula II Reference A): S. Ilievski et al., Glastech. Ber, Glass Sci. Technol., 73 (2000) 39.

The glass substrate to be analyzed and the standard sample whose hydrogen concentration is known, as prepared according to the above-mentioned method, are simultaneously fed into a SIMS device, and analyzed sequentially to obtain the depth direction profiles of the intensities of $^1H^-$ and $^{30}Si^-$. Subsequently, the $^1H^-$ profile is divided by the $^{30}Si^-$ profile to obtain a depth direction profile of $^1H^-/^{30}Si^-$ intensity ratio. From the depth direction profile of the $^1H^-/^{30}Si^-$ intensity ratio of the standard sample, an average $^1H^-/^{30}Si^-$ intensity ratio in a region of a depth of from 1 μm to 2 μm is calculated, and a calibration curve of this value and the hydrogen concentration is drawn to pass through the origin (calibration curve with one-level standard sample). Using the calibration curve, the $^1H^-/^{30}Si^-$ intensity ratio on the vertical axis of the profile of the glass substrate to be analyzed is converted into the hydrogen concentration. Accordingly, the hydrogen concentration profile of the glass substrate to be analyzed is obtained. The measurement conditions in SIMS and IR are as follows.

[SIMS Measurement Condition]
Device: ADEPT1010 manufactured by ULVAC-PHI, Inc.,
Primary ion species: $Cs^+$
Primary ion accelerating voltage: 5 kV
Primary ion current value: 500 nA
Primary ion incident angle: 60° relative to the normal line of the sample plane
Primary ion luster size: 300×300 μm$^2$
Secondary ion polarity: minus
Secondary ion detection region: 60×60 μm$^2$ (4% of luster size of primary ion)
ESA Input Lens: 0
Use of neutralization gun: yes
Method of converting the horizontal axis from sputtering time to depth: The depth of the analysis crater is measured with a stylus surface profile analyzer (Dektak 150, manufactured by Veeco Inc.), and the primary ion sputtering rate is determined. Using the sputtering rate, the horizontal axis is converted from the sputtering time to the depth. Field Axis Potential in $^1H^-$ detection: The optimum value may change in every device. The operator should carefully define the value so that the background is fully cut off.

Figure 6:
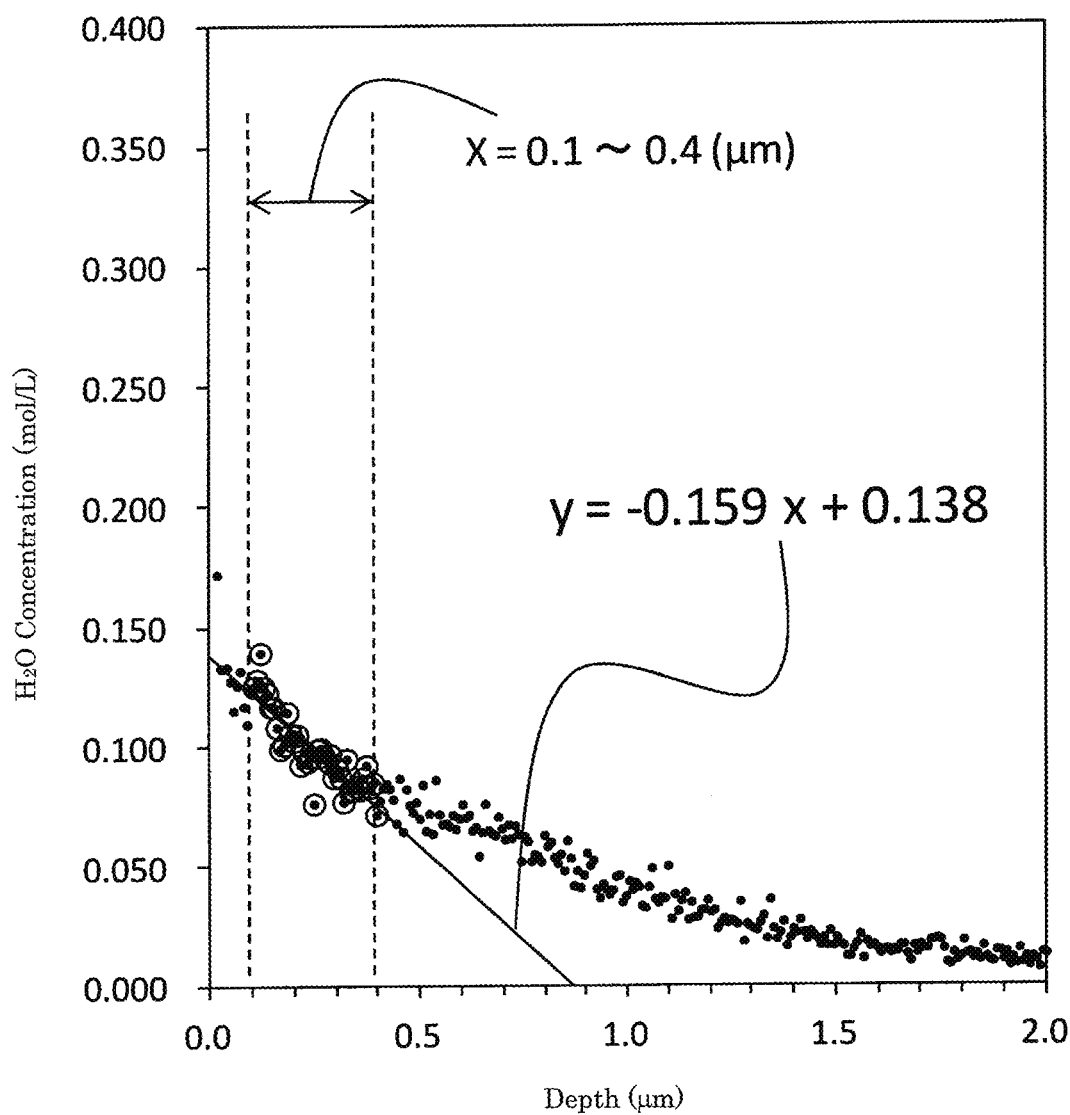
FIG. 6 is an explanatory view for deriving the relational equation (I) from the graph of plotting the hydrogen concentration profile in the surface layer of the chemically strengthened glass obtained in Example 1.
Figure 7:
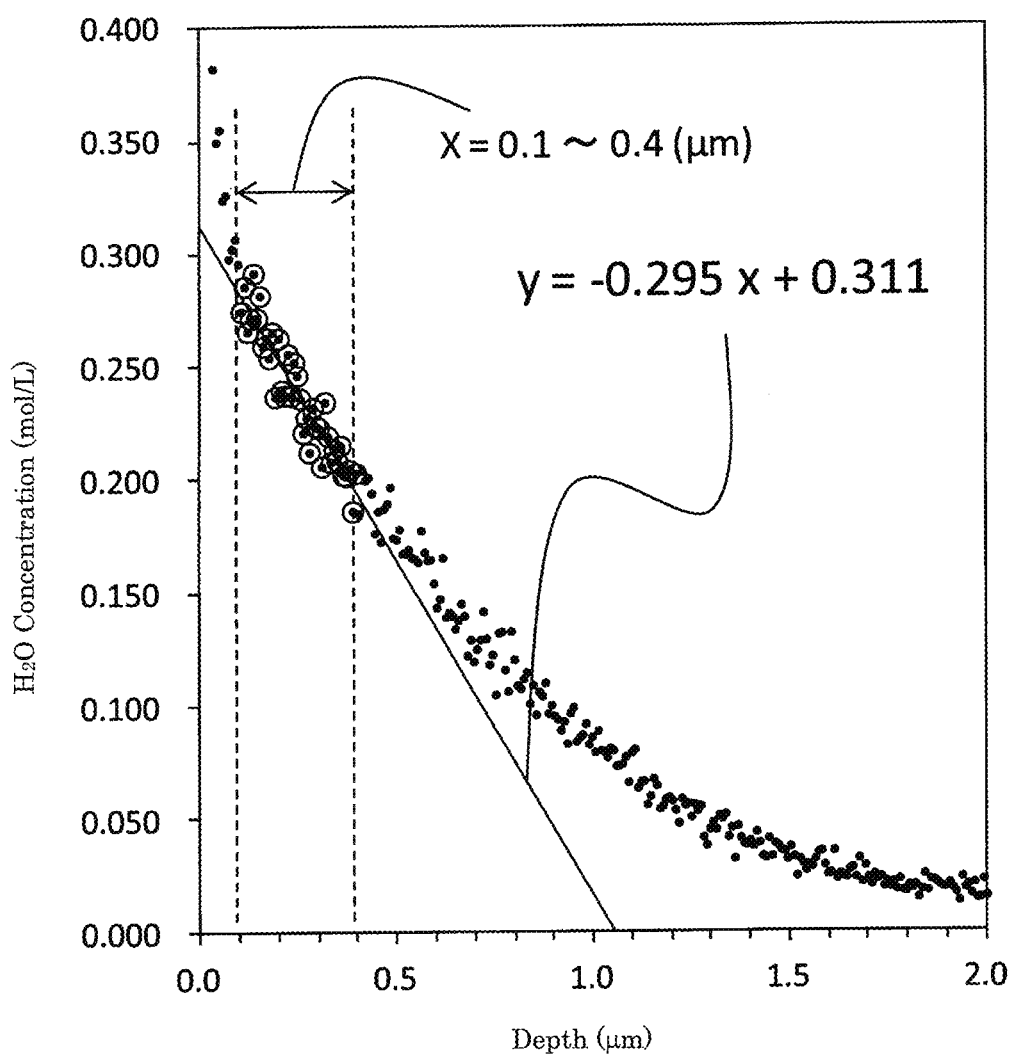
FIG. 7 is an explanatory view for deriving the relational equation (I) from the graph of plotting the hydrogen concentration profile in the surface layer of the chemically strengthened glass obtained in Comparative Example 1.

[IR Measurement Condition]
Device: Nic-plan/Nicolet 6700, manufactured by Thermo Fisher Scientific Co., Ltd.
Resolution: 4 $cm^{-1}$
Number of scans: 16
Detector: TGS detector For deriving the relational equation (I) from the hydrogen concentration profile ($H_2O$ concentration, mol/L) of the glass determined under the above-mentioned analysis condition, the following procedure is employed. As shown in FIG. 6 and FIG. 7, linear approximation is applied to the hydrogen concentration profile in a region of a depth of from 0.1 to 0.4 μm. The equation of the resultant approximation straight line is referred to as the relational equation (I).

As a means of controlling a and b, for example, the fusing agent concentration, sodium concentration, temperature and time in the chemical strengthening step may be changed.

It is preferable that the chemically strengthened glass of the present invention has an average hydrogen concentration c of from 0.070 to 0.150 mol/L in a near-surface region (depth X from the outermost surface is 0.1 to 0.4 μm). It is thought that in a case where the average hydrogen concentration is within that range, not only the chemically strengthened glass has a high surface strength but also the reliability of the surface strength is improved. Incidentally, the average hydrogen concentration c can be obtained from the hydrogen concentration profile described above.

(Surface Polishing Flaws)

Figure 13:
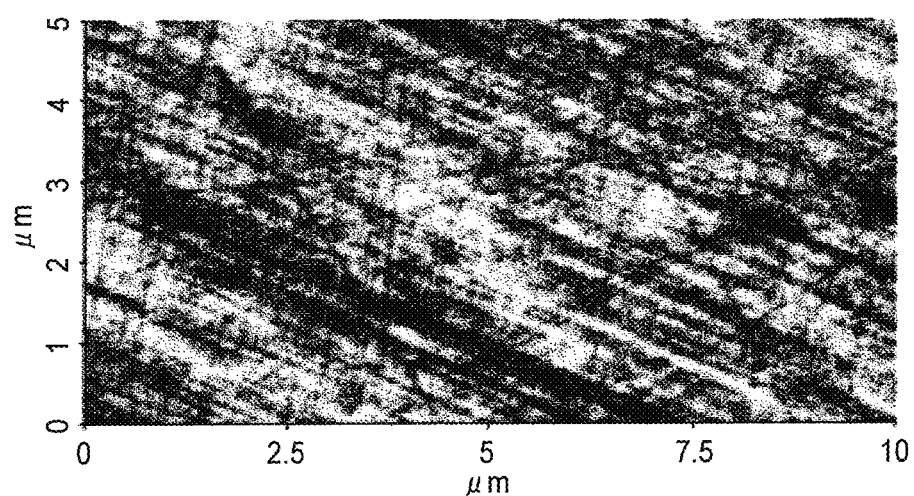
FIG. 13 is an AFM image of a glass surface having surface polishing flaws.
Figure 14:
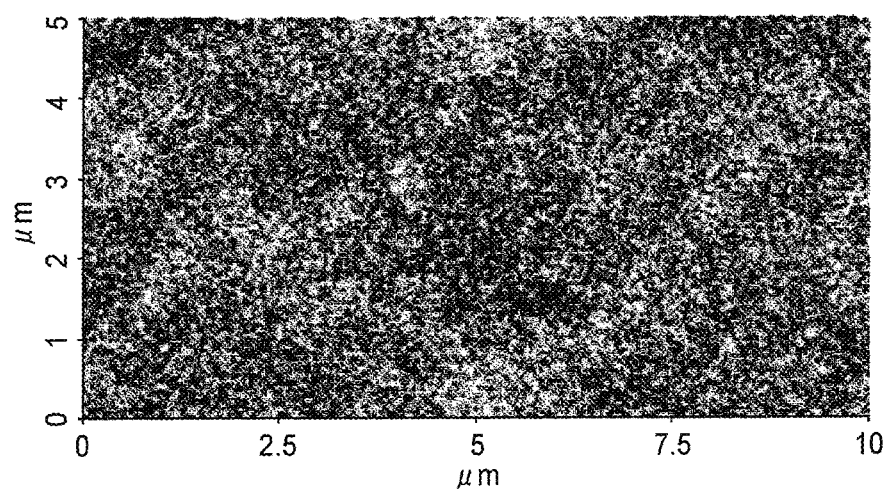
FIG. 14 is an AFM image of a glass surface having no surface polishing flaw.

The chemically strengthened glass of the present invention has no polishing flaw on the surface thereof. Here, polishing in the present invention means that the surface of a glass is polished with abrasives for smoothing. The presence or absence of polishing flaws may be discerned through surface observation with AFM (Atomic Force Microscope). A case where two or more scratches each having a length of 5 μm or more and a width of 0.1 μm or more are not present in a region of 10 μm×5 μm can be said to be in a state that the surface has no polishing flaw. FIG. 13 shows a state having surface polishing flaws, and FIG. 14 shows a state having no surface polishing flaw.

(Glass Surface Strength)

The surface strength of the chemically strengthened glass of the present invention can be evaluated according to a ball-on-ring test.

(Ball-On-Ring Test)

The chemically strengthened glass of the present invention is evaluated in terms of the BOR surface strength F (N) measured by a ball-on-ring (BOR) test, in which a glass sheet is disposed on a stainless ring whose diameter is 30 mm and whose contact part has a roundness with a curvature radius of 2.5 mm, and while a steel ball having a diameter of 10 mm is kept in contact with the glass sheet, the center of the ring is subjected to a load by the ball under a static loading condition.

The chemically strengthened glass of the present invention satisfies $F \geq 1,500 \times t^2$, preferably $F \geq 1,800 \times t^2$. [In the formulae, F means the BOR surface strength (N) measured by the ball-on-ring test, and t means the thickness (mm) of the glass sheet.] When the BOR surface strength F (N) falls within the range, the glass exhibits an excellent surface strength even when formed into a thin sheet.

FIG. 1 shows a schematic view for explaining the ball-on-ring test used in the present invention. In the ball-on-ring (BOR) test, a glass sheet 1 is, while kept set horizontally, pressurized by a pressurizing jig 2 made of SUS304 (hardened steel, diameter: 10 mm, mirror-finished) to measure the surface strength of the glass sheet 1.

In FIG. 1, the glass sheet 1 to be a sample is horizontally set on a receiving jig 3 made of SUS304 (diameter: 30 mm, radius of curvature of the contact part R: 2.5 mm, the contact part is hardened steel, mirror-finished). Above the glass sheet 1, a pressurizing jig 2 for pressurizing the glass sheet 1 is arranged.

In this embodiment, the center region of the glass sheet 1 obtained in Examples and Comparative Examples is pressurized from above. The test condition is as mentioned below.

Descending Rate of Pressurizing Jig 2: 1.0 (mm/min)

In this test, the fracture load (unit: N) at which the glass is fractured is taken as a BOR surface strength. The average value of twenty measured values thereof is taken as a surface strength F. However, in a case where the fracture origin of the glass sheet is separated from a loading point of the ball by 2 mm or more, the obtained value is excluded from the data for calculating the average value.

The chemically strengthened glass of the present invention not only has a high surface strength as described above but also has high reliability of the surface strength. As shown the Weibull plots of the BOR surface strength evaluation of chemically strengthened glasses shown in Examples which will be described later, it can be seen that the chemically strengthened glass of the present invention has little unevenness in surface strength. Although the reason therefor is unclear, it is presumed that the reduced unevenness in surface strength is due to the hydrogen (moisture) concentration which is slightly high in the vicinity of the glass surface layer.

(Surface Roughness)

The chemically strengthened glass of the present invention further has a surface roughness (Ra) of 0.20 nm or higher. Since the surface roughness thereof is not less than that value, a chemically strengthened glass having a high surface strength can be obtained. It is presumed that since the glass surface has some degree of surface roughness, stress concentration is suppressed to enhance surface strength.

The surface roughness can be measured, for example, through a surface observation with an AFM on a measuring area of 1 μm×1 μm.

Incidentally, conventional, chemically strengthened, unpolished glass sheets have a surface roughness of less than 0.20 nm.

[Measurement Conditions of AFM]

Apparatus: Nanoscope V+MultiMode 8 or Dimension ICON, manufactured by Bruker GmbH Mode: ScanAsyst mode Probe: RTESPA (spring constant: 40 N/m)

Samples/line: 256

Lines: 256

Scan rate: 1 Hz

View to be measured: 1×1 μm² (targeting uncontaminated area)

<Method for Producing Chemically Strengthened Glass>

One embodiment of the method for producing a chemically strengthened glass of the present invention is described below, to which, however, the present invention is not limited.

(Glass Composition)

Glass for use in the present invention may be any one containing sodium, and so far as it has a composition capable of being shaped and strengthened through chemical strengthening treatment, various types of compositions can be used. Specifically, for example, there are mentioned an aluminosilicate glass, a soda-lime glass, a boron silicate glass, a lead glass, an alkali barium glass, an aluminoborosilicate glass, etc.

The production method for a glass is not specifically limited. Desired glass raw materials are put into a continuous melting furnace, and the glass raw materials are melted under heat at preferably from 1,500 to 1,600° C., then refined and fed into a shaping device to shape the molten glass into a plate-like shape and gradually cooled to produce a glass.

Various methods may be employed for shaping a glass. For example, various shaping processes such as a down-draw process (for example, an overflow down-draw process, a slot-down process, a redraw process, etc.), a float process, a roll-out process, and a pressing process may be employed.

The thickness of a glass is not specifically limited, but for effectively conducting chemical strengthening treatment, in general, the thickness thereof is preferably 5 mm or less, more preferably 3 mm or less.

The shape of a glass for use in the present invention is not specifically limited. For example, various shapes of a glass such as a plate-like shape having a uniform thickness, a curved shape in which at least one of the front surface or the back surface is curved, and a three-dimensional shape having a bend portion are employable.

Although the composition of the chemically strengthened glass of the present invention is not specifically limited, for example, the following glass compositions may be mentioned.

(i) Glass having a composition including, in terms of mol %, from 50 to 80% of $SiO_2$, from 2 to 25% of $Al_2O_3$, from 0 to 10% of $Li_2O$, from 0 to 18% of $Na_2O$, from 0 to 10% of $K_2O$, from 0 to 15% of MgO, from 0 to 5% of CaO and from 0 to 5% of $ZrO_2$.

(ii) Glass having a composition including, in terms of mol %, from 50 to 74% of $SiO_2$, from 1 to 10% of $Al_2O_3$, from 6 to 14% of $Na_2O$, from 3 to 11% of $K_2O$, from 2 to 15% of MgO, from 0 to 6% of CaO and from 0 to 5% of $ZrO_2$, in which the total content of $SiO_2$ and $Al_2O_3$ is 75% or less, the total content of $Na_2O$ and $K_2O$ is from 12 to 25%, and the total content of MgO and CaO is from 7 to 15%.

(iii) Glass having a composition including, in terms of mol %, from 68 to 80% of $SiO_2$, from 4 to 10% of $Al_2O_3$, from 5 to 15% of $Na_2O$, from 0 to 1% of $K_2O$, from 4 to 15% of MgO and from 0 to 1% of $ZrO_2$.

(iv) Glass having a composition including, in terms of mol %, from 67 to 75% of $SiO_2$, from 0 to 4% of $Al_2O_3$, from 7 to 15% of $Na_2O$, from 1 to 9% of $K_2O$, from 6 to 14% of MgO and from 0 to 1.5% of $ZrO_2$, in which the total content of $SiO_2$ and $Al_2O_3$ is from 71 to 75%, the total content of $Na_2O$ and $K_2O$ is from 12 to 20%, and the content of CaO, if any, is less than 1%.

The chemically strengthened glass of the present invention has an ion-exchanged compressive stress layer in the surface thereof. In the ion exchange method, the surface of a glass is ion-exchanged to form a surface layer in which compressive stress remains. Specifically, the alkali metal ion (typically Li ion, Na ion) having a small ionic radius in the surface of a glass sheet is substituted with an alkali ion having a larger ionic radius (typically Na ion or K ion for Li ion, and K ion for Na ion) through ion exchange at a temperature not higher than the glass transition point. Accordingly, compressive stress remains in the surface of the glass, and the surface strength of the glass is thereby increased.

In the production method of the present invention, chemical strengthening is conducted by bringing a glass into contact with an inorganic salt containing potassium nitrate ($KNO_3$). Accordingly, the Na ion in the glass surface is ion-exchanged with the K ion in the inorganic salt to form a high-density compressive stress layer. The method for bringing a glass into contact with an inorganic salt includes a method of applying a pasty inorganic salt to a glass, a method of spraying a glass with an aqueous solution of an inorganic salt, and a method of immersing a glass in a salt bath of a molten salt heated at a temperature not lower than the melting point thereof, and of these, a method of immersing in a molten salt is desirable.

The inorganic salt is preferably one having a melting point not higher than the strain point of the glass to be strengthened (generally 500 to 600° C.), and in the present invention, a salt containing potassium nitrate (melting point: 330° C.) is preferred. Containing potassium nitrate, the salt is preferred as capable of being in a molten state at a temperature not higher than the strain point of the glass and, in addition, capable of being easily handled in the operating temperature range. The content of the potassium nitrate in the inorganic salt is preferably 50% by mass or more.

Additionally, the inorganic salt preferably contains at least one salt selected from the group consisting of $K_2CO_3$, $Na_2CO_3$, $KHCO_3$, $NaHCO_3$, $K_3PO_4$, $Na_3PO_4$, $K_2SO_4$, $Na_2SO_4$, KOH and NaOH, and above all, more preferably contains at least one salt selected from the group consisting of $K_2CO_3$, $Na_2CO_3$, $KHCO_3$ and $NaHCO_3$.

The above-mentioned salt (hereinafter this may be referred to as "fusing agent") has a property of cutting the network of a glass typified by an Si—O—Si bond. Since the temperature at which chemical strengthening treatment is conducted is high such as a few hundred degrees C., the covalent bond between Si—O in a glass is suitably cut at that temperature and therefore the density-reducing treatment to be mentioned below for the glass can be easy to promote.

The degree of cutting the covalent bond may vary depending on the glass composition, the type of the salt (fusing agent) to be used, and the chemical strengthening treatment conditions such as the temperature and the time, but is considered to be preferably selected from the conditions under which from 1 to 2 bonds of the four covalent bonds extending from Si can be cut.

For example, in a case where $K_2CO_3$ is used as a fusing agent, the content of the fusing agent in the inorganic salt is 0.1 mol % or more and the chemical strengthening treatment temperature is from 350 to 500° C., the chemical strengthening treatment time is preferably from 1 minute to 10 hours, more preferably from 5 minutes to 8 hours, even more preferably from 10 minutes to 4 hours.

The amount of the fusing agent to be added is, from the viewpoint of surface hydrogen concentration control, preferably 0.1 mol % or more, more preferably 1 mol % or more, and particularly preferably 2 mol % or more. From the viewpoint of productivity, the amount thereof is preferably not larger than the saturation solubility of each salt. When the fusing agent is excessively added, there is a concern of causing glass corrosion. For example, in a case where $K_2CO_3$ is used as the fusing agent, the amount thereof is preferably 24 mol % or less, more preferably 12 mol % or less, particularly preferably 8 mol % or less.

The inorganic salt may contain any other chemical species within a range not impairing the advantageous effects of the present invention, in addition to potassium nitrate and the fusing agent. For example, there are mentioned alkali chloride salts or alkali borate salts such as sodium chloride, potassium chloride, sodium borate, and potassium borate. One or more of these may be added either singly or as combined.

The production method of the present invention is described below with reference to examples of an embodiment in which chemical strengthening is performed according to a method of immersing a glass in a molten salt.

(Production of Molten Salt 1)

A molten salt may be produced according to steps mentioned below.

Step 1a: Preparation of Potassium Nitrate Molten Salt

Step 2a: Addition of Fusing Agent to the Potassium Nitrate Molten Salt (Step 1a—Preparation of Potassium Nitrate Molten Salt—)

In the step 1a, potassium nitrate is put into a container, and melted by heating at a temperature not lower than the melting point thereof to prepare a molten salt. The melting is conducted at a temperature falling within a range of from the melting point (330° C.) of potassium nitrate to the boiling point (500° C.) thereof. In particular, it is more preferable that the melting temperature is from 350 to 470° C. from the viewpoint of the balance between the surface compressive stress (CS) to be given to a glass and the depth of the compressive stress layer (DOL) and of the strengthening time.

Regarding the container for melting potassium nitrate, metals, quartz, ceramics and the like can be used. Above all, from the viewpoint of durability, metal materials are desirable, and from the viewpoint of corrosion resistance, stainless steel (SUS) materials are preferred.

(Step 2a—Addition of Fusing Agent to the Potassium Nitrate Molten Salt—)

In the step 2a, the above-mentioned fusing agent is added to the potassium nitrate molten salt prepared in the step 1a, and, while kept at a temperature falling within a certain definite range, mixed with an impeller or the like so that the whole becomes uniform. In a case where plural fusing agents are used, the order of adding them is not specifically limited, and these may be added at a time.

The temperature is preferably not lower than the melting point of potassium nitrate, that is, preferably 330° C. or higher, more preferably from 350 to 500° C. The stirring time is preferably from 1 minute to 10 hours, more preferably from 10 minutes to 2 hours.

(Production of Molten Salt 2)

In the above-mentioned production of molten salt 1, a method of adding a fusing agent after preparation of a molten salt of potassium nitrate is exemplified, but apart from the method, the molten salt may also be produced according to the following steps.

Step 1 b: Mixing of Potassium Nitrate and Fusing Agent

Step 2b: Melting of Mixed Salt of Potassium Nitrate and Fusing Agent (Step 1b—Mixing of Potassium Nitrate and Fusing Agent—)

In the step 1b, potassium nitrate and a fusing agent are put into a container and mixed with an impeller or the like. In a case where plural fusing agents are used, the order of adding them is not specifically limited, and these may be added at a time. The container to be used may be the same one as that to be used in the above-mentioned step 1a.

(Step 2b—Melting of Mixed Salt of Potassium Nitrate and Fusing Agent—)

In the step 2b, the mixed salt obtained in the step 1b is melted by heating. The melting is conducted at a temperature falling within a range of from the melting point (330° C.) of potassium nitrate to the boiling point (500° C.) thereof. In particular, it is more preferable that the melting temperature is from 350 to 470° C. from the viewpoint of the balance between the surface compressive stress (CS) to be given to a glass and the depth of the compressive stress layer (DOL) and of the strengthening time. The stirring time is preferably from 1 minute to 10 hours, more preferably from 10 minutes to 2 hours.

In a case where sediments form in the molten salt obtained through the above-mentioned step 1a and the step 2a, or through the step 1b and the step 2b, by adding a fusing agent thereto, the molten salt is kept statically until the sediments precipitate in the bottom of the container, before the chemical strengthening treatment for a glass. The sediments contain the fusing agent exceeding the saturation solubility thereof, and salts formed through exchange of cation in the fusing agent in the molten salt.

The molten salt for use in the production method of the present invention has an Na concentration of preferably 500 ppm by weight or more, more preferably 1,000 ppm by weight or more. The Na concentration of 500 ppm by weight or more in the molten salt is preferred since the low-density layer can easily deepen in the acid treatment step to be mentioned hereinunder. The upper limit of the Na concentration is not specifically defined, and is acceptable to a level at which a desired surface compressive stress (CS) can be obtained.

The molten salt used for chemical strengthening treatment once or more contains sodium released from a glass. Therefore, when the Na concentration is already within the above-mentioned range, glass-derived sodium may be used as such for the Na source, or when the Na concentration is insufficient or when a fresh molten salt that has not been used for chemical strengthening treatment is used, the Na concentration may be controlled by adding an inorganic sodium salt such as sodium nitrate.

As described above, a molten salt can be prepared according to the above-mentioned step 1a and the step 2a, or the step 1b and the step 2b.

(Chemical Strengthening)

Next, using the prepared molten salt, chemical strengthening treatment is performed. In the chemical strengthening treatment, a glass is immersed in a molten salt and the metal ion (Na ion) in the glass is substituted with a metal ion (K ion) having a larger ionic radius in the molten salt. Through the ion exchange, the composition of the glass surface is changed, and the glass surface is densified to form a compressive stress layer 20 [(a) to (b) in FIG. 2]. The densification of the glass surface generates compressive stress to strengthen the glass.

In fact, the density of chemically strengthened glass gradually increases from the outer edge of the interlayer 30 (bulk) existing in the center of the glass toward the surface of the compressive stress layer, and therefore between the interlayer and the compressive stress layer, there exists no definite boundary at which the density suddenly changes. Here, the interlayer means a layer existing in the center part of the glass and surrounded by the compressive stress layer. The interlayer is a layer not undergone ion exchange, differing from the compressive stress layer.

Specifically, the chemical strengthening treatment in the present invention is performed by the following step 3.

Step 3: Chemical Strengthening Treatment for Glass (Step 3—Chemical Strengthening Treatment for Glass—)

In the step 3, a glass is preheated, and the temperature of the molten salt prepared in the above-mentioned step 1a and the step 2a or the step 1b and the step 2b is adjusted to a temperature for chemical strengthening. Next, the preheated glass is immersed in the molten salt for a predetermined period of time, then the glass is drawn up from the molten salt and left cooled. Preferably, prior to the chemical strengthening treatment, the glass is processed for shaping in accordance with the use thereof, for example, through mechanical processing such as cutting, end surface machining, drilling, etc.

The glass preheating temperature depends on the temperature at which the glass is immersed in a molten salt, but, in general, preferably 100° C. or higher.

The chemical strengthening temperature is preferably not higher than the strain point of the glass to be strengthened (generally 500 to 600° C.), but for obtaining a greater compressive stress layer depth, particularly preferably 350° C. or higher.

The immersion time for the glass in a molten salt is preferably from 1 minute to 10 hours, more preferably from 5 minutes to 8 hours, even more preferably from 10 minutes to 4 hours. Falling within the range, it is possible to obtain a chemically strengthened glass excellent in the balance between the surface strength and the depth of the compressive stress layer.

In the production method of the present invention, the following steps are performed after the chemical strengthening treatment.

Step 4: Washing of the Glass
Step 5: Acid Treatment of the Glass after Step 4

Figure 2:
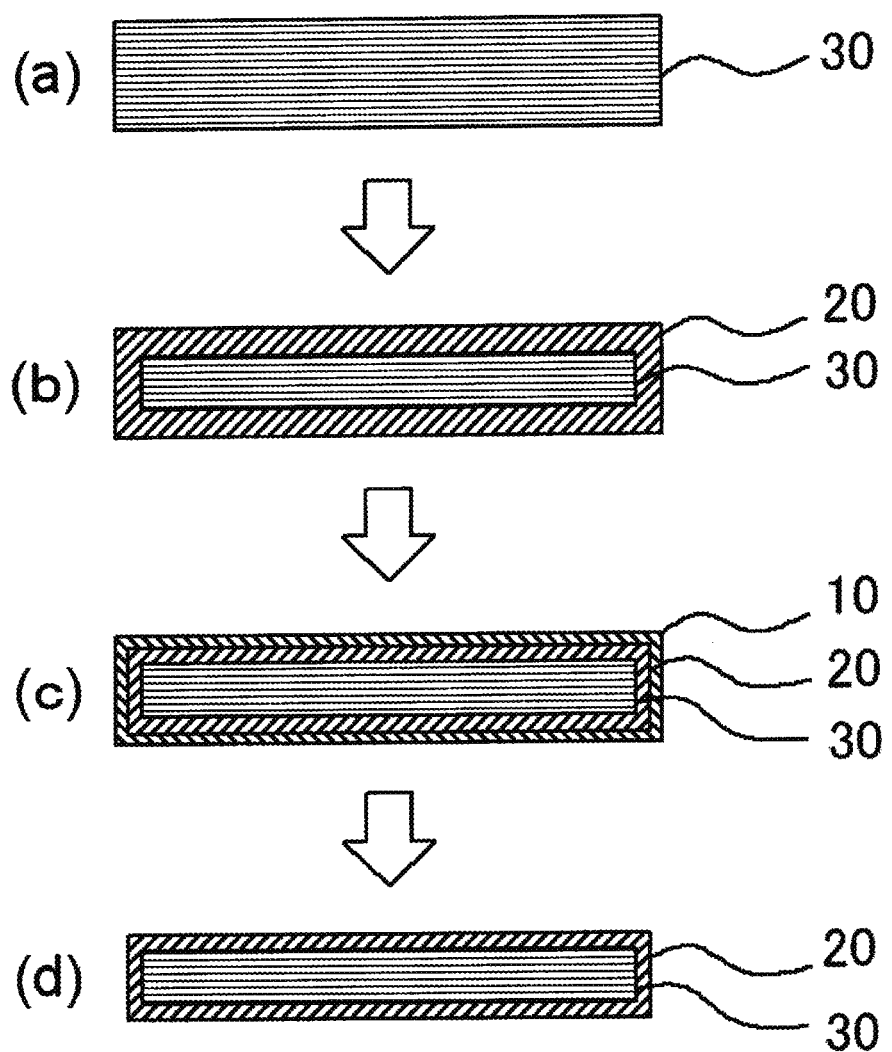
FIG. 2 is a schematic view showing a production process of a chemically strengthened glass according to the present invention.

At the time after the above-mentioned step 5, the glass surface further has a low-density layer 10 in which the surface layer of the compressive stress layer 20 has been denatured, specifically, the density thereof has been reduced [(b) to (c) in FIG. 2]. The low-density layer is formed through leaching of Na and K from the outermost surface of the compressive stress layer, and in place of these, H has penetrated (substituted) therein.

The step 4 and the step 5 are described in detail hereinunder.

(Step 4—Washing of Glass—)

In the step 4, the glass is washed with industrial water, ion-exchanged water or the like. Above all, ion-exchanged water is preferred. The washing condition may vary depending on the washing liquid to be used, but in a case where ion-exchanged water is used, it is preferable that the glass is washed at 0 to 100° C. from the viewpoint of completely removing the adhered salts.

(Step 5—Acid Treatment—)

In the step 5, the glass washed in the step 4 is further subjected to an acid treatment.

In the acid treatment for a glass, a chemically strengthened glass is immersed in an acidic solution, whereby Na and/or K in the surface of the chemically strengthened glass can be substituted with H.

The solution is not specifically limited so far as it is acidic and has a pH of less than 7, in which the acid to be used may be a weak acid or a strong acid. Specifically, the acid is preferably hydrochloric acid, sulfuric acid, phosphoric acid, acetic acid, oxalic acid, carbonic acid, citric acid, etc. These acids may be used either singly or as combined.

The temperature for performing the acid treatment varies depending on the type and the concentration of the acid to be used and the treating time, but is preferably 100° C. or lower.

The time for performing the acid treatment also varies depending on the type, the concentration and the temperature of the acid to be used, but is preferably from 10 seconds to 5 hours from the viewpoint of productivity, more preferably from 1 minute to 2 hours.

The concentration of the solution for performing the acid treatment varies depending on the type and the temperature of the acid to be used and the treating time, but is preferably a concentration in which risk of container corrosion is less, and specifically, the concentration thereof is preferably from 0.1 wt % to 20 wt %.

The low-density layer is removed in alkali treatment to be mentioned below, and a thicker low-density layer is preferred as the glass surface is easy to remove. Accordingly, the thickness of the low-density layer is preferably 5 nm or more from the viewpoint of the amount of glass surface removal, more preferably 20 nm or more. The thickness of the low-density layer may be controlled by controlling the fusing agent concentration, the sodium concentration, the temperature, the time and the like in the chemical strengthening step.

The density of the low-density layer is preferably lower than the density in the region (bulk) deeper than the ion-exchanged compressive stress layer, from the viewpoint the glass surface removability.

The thickness of the low-density layer may be determined from the period ($\Delta\theta$) measured in X-ray reflectometry (XRR).

The density of the low-density layer may be determined from the critical angle ($\theta c$) measured in XRR.

In a simplified manner, formation of a low-density layer and the thickness of the layer may be confirmed through observation of the cross section of a glass with a scanning electronic microscope (SEM).

In the production method of the present invention, the following step is performed after the acid treatment.

Step 6: Alkali Treatment

In the step 6, a part or all of the low-density layer 10 formed up to the step 5 may be removed [(c) to (d) in FIG. 2].

The step 6 is described in detail hereinunder.

(Step 6—Alkali Treatment—)

In the step 6, the glass having been subjected to the acid treatment in the step 5 is further subjected to an alkali treatment.

In the alkali treatment, the chemically strengthened glass is immersed in a basic solution, whereby a part or all of the low-density layer is removed.

The solution is not specifically limited so far as it is basic and has a pH of more than 7, in which any of a weak base or a strong base is usable. Specifically, a base such as sodium hydroxide, potassium hydroxide, potassium carbonate, sodium carbonate or the like is preferred. These bases may be used either singly or as combined.

The temperature for performing the alkali treatment varies depending on the type and the concentration of the base to be used and the treating time, but is preferably from 0 to 100° C., more preferably from 10 to 80° C., even more preferably from 20 to 60° C. The temperature range is preferred as causing no risk of glass corrosion.

The time for performing the alkali treatment also varies depending on the type, the concentration and the temperature of the base to be used, but is preferably from 10 seconds to 5 hours from the viewpoint of productivity, more preferably from 1 minute to 2 hours.

The concentration of the solution for performing the alkali treatment varies depending on the type and the temperature of the base to be used and the treating time, but is preferably from 0.1 wt % to 20 wt % from the viewpoint of glass surface removability.

Through the above-mentioned alkali treatment, a part or all of the low-density layer with H having penetrated thereinto is removed and the surface layer in which the hydrogen concentration profile satisfies the specific relational equation (I) described above is exposed out. Accordingly, a chemically strengthened glass having an improved surface strength can be obtained. Further, since the low-density layer is removed, the flaws existing in the glass surface are also removed at the same time. Therefore, it is considered that this point also contributes to the surface strength improvement.

Between the above-mentioned acid treatment step 5 and the alkali treatment step 6, or after the alkali treatment step 6, it is preferable to perform a washing step like the step 4.

In the production method of the present invention, the chemical liquids to be handled are highly safe and therefore the method does not require any special equipment. Accordingly, a chemically strengthened glass whose surface strength has dramatically increased can be obtained safely and efficiently.

The amount of the low-density layer to be removed depends on the alkali treatment condition. An embodiment in which the low-density layer 10 has been completely removed is shown in (d) of FIG. 2, however, a part of the low-density layer 10 may be removed while a part thereof has remained. From the viewpoint of surface strength improvement, the effect can be obtained even when not all the low-density layer is removed, but from the viewpoint of stably securing the transmittance of glass, it is preferable that all the low-density layer is removed.

EXAMPLES

The present invention is described specifically with reference to Examples given below, but the present invention is not limited thereto.
<Evaluation Method>
Various evaluations in present Examples were performed according to the analysis methods mentioned below.
(Evaluation of Glass: Surface Stress)

The compressive stress value of the compressive stress layer and the depth of the compressive stress layer in the chemically strengthened glass of the present invention can be measured using EPMA (electron probe microanalyzer) or a surface stress meter (for example, FSM-6000 manufactured by Orihara Manufacturing Co., Ltd.), etc. In Examples, the surface compressive stress value (CS, unit: MPa) and the depth of the compressive stress layer (DOL, unit: µm) were measured using a surface stress meter (FSM-6000) manufactured by Orihara Manufacturing Co., Ltd.
(Evaluation of Glass: Removal Amount)

The removal amount thickness of a glass was determined by measuring the weight thereof before and after chemical liquid treatment, using an analytical electronic balance (HR-202i, manufactured by A&D Company, Limited), and converting the found value into a thickness according to the following equation.

(Removal amount thickness per one surface)= ((weight before treatment)−(weight after treatment))/(glass specific gravity)/treated area/2

At this time, the calculation was made while defining the glass specific gravity as 2.48 (g/cm$^3$).
(Evaluation of Glass: Surface Strength)

The glass surface strength was measured according to the ball-on-ring (BOR) test. FIG. 1 shows a schematic view for explaining the ball-on-ring test employed in the present invention. A glass sheet 1 was, while kept set horizontally, pressurized by a pressurizing jig 2 made of SUS304 (hardened steel, diameter 10 mm, mirror-finished) to measure the surface strength of the glass sheet 1.

In FIG. 1, the glass sheet 1 to be a sample is horizontally disposed on a receiving jig 3 made of SUS304 (diameter: 30 mm, curvature radius of the contact part R: 2.5 mm, the contact part is hardened steel, mirror-finished). Above the glass sheet 1, a pressurizing jig 2 for pressurizing the glass sheet 1 is arranged.

In this embodiment, the center region of the glass sheet 1 obtained in Examples and Comparative Examples was pressurized from the above of the glass sheet 1. The test condition is as mentioned below.
Descending Rate of Pressurizing Jig 2: 1.0 (Mm/Min)

In this test, the fracture load (unit: N) at which the glass was fractured was taken as a BOR surface strength. The average value of twenty measured values thereof was taken as a surface strength F. However, in a case where the fracture origin of the glass sheet was separated from a loading point of the ball by 2 mm or more, the obtained value was excluded from the data for calculating the average value.
(Evaluation of Glass: Surface Roughness)

The surface roughness of a glass was measured using an AFM under the following conditions.
[Measurement Conditions of AFM]
Apparatus: Nanoscope V+MultiMode 8 or Dimension ICON, manufactured by Bruker GmbH
Mode: ScanAsyst mode
Probe: RTESPA (spring constant: 40 N/m)
Samples/line: 256
Lines: 256
Scan rate: 1 Hz
View to be measured: 1×1 µm$^2$ (targeting uncontaminated area)
(Evaluation of Glass: Hydrogen Concentration)

According to the method described in the section of [Method for Measuring Hydrogen Concentration Profile] given hereinabove, the hydrogen concentration profile was determined and the relational equation (I) and an average hydrogen concentration (c value) were derived therefrom.

Example 1

(Chemically Strengthening Step)

In a SUS-made cup, 9,700 g of potassium nitrate, 890 g of potassium carbonate and 400 g of sodium nitrate were introduced, and the contents were heated to 450° C. with a mantle heater to prepare a molten salt containing 6 mol % of sodium carbonate and 10,000 ppm by weight of sodium. Aluminosilicate glass A (specific gravity: 2.48) having dimensions of 50 mm×50 mm×0.56 mm was prepared, preheated at 200 to 400° C., and subjected to a chemical strengthening treatment by immersing in the molten salt at 450° C. for 2 hours for ion exchange and cooling to around room temperature. The resultant chemically strengthened glass was washed with water and subjected to the next step.

Composition of the aluminosilicate glass A (in terms of mol %): $SiO_2$ 64.4%, $Al_2O_3$ 8.0%, $Na_2O$ 12.5%, $K_2O$ 4.0%, MgO 10.5%, CaO 0.1%, SrO 0.1%, BaO 0.1%, $ZrO_2$ 0.5%
(Acid Treatment Step)

In a beaker, 13.4 wt % hydrochloric acid (HCl, manufactured by Kanto Chemical Co., Inc.) was prepared, and the temperature thereof was adjusted to 41° C. using a water bath. The glass obtained in the chemical strengthening step was immersed in the hydrochloric acid whose temperature was adjusted, for 180 seconds to perform acid treatment, and then washed with pure water several times, and thereafter dried with air blowing. The resultant glass was subjected to the next step.
(Alkali Treatment Step)

An aqueous solution of 4.0 wt % sodium hydroxide was prepared in a beaker, and the temperature thereof was adjusted to 40° C. using a water bath. The glass obtained in the acid treatment step was immersed in the potassium hydroxide aqueous solution whose temperature was adjusted, for 120 seconds to perform alkali treatment, and then washed with pure water several times, and thereafter dried with air blowing.

Thus, a chemically strengthened glass of Example 1 was obtained.

Example 2

A chemically strengthened glass was produced in the same manner as in Example 1, except that an aluminosilicate glass A having the sheet thickness shown in Table 1 was used, that the temperature of the molten salt and the ion exchange treatment time were changed to 430° C. and 40 minutes, respectively, and that an acid treatment and an alkali treatment were performed by showering the prepared aqueous hydrochloric acid solution and aqueous sodium hydroxide solution on the glass for 277 seconds each using a glass washer of the type in which glass sheets were horizontally held and conveyed.

Example 3

A chemically strengthened glass was produced in the same manner as in Example 1, except that an aluminosilicate glass B (specific gravity: 2.41) having dimensions of 50 mm×50 mm×0.72 mm and having the following composition was used in place of the aluminosilicate glass A, that in the acid treatment step, 6.0 wt % nitric acid ($HNO_3$; manufactured by Kanto Chemical Co., Inc.) was prepared in a resinous tank and the temperature thereof was adjusted to 41° C. using a fluororesin-coated heater (KKS14A, manufactured by Hakko Electric Co. Ltd.), and that the glass was immersed for 120 seconds in the nitric acid whose temperature was adjusted, thereby performing an acid treatment.

Composition of aluminosilicate glass B (in terms of mol %): $SiO_2$ 68%, $Al_2O_3$ 10%, $Na_2O$ 14%, MgO 8%

Example 4

A chemically strengthened glass was produced in the same manner as in Example 3, except that an aluminoborosilicate glass (specific gravity: 2.38) having dimensions of 50 mm×50 mm×0.70 mm and having the following composition was used in place of the aluminosilicate glass A.

Composition of the aluminoborosilicate glass (in terms of mol %): $SiO_2$ 67%, $B_2O_3$ 4%, $Al_2O_3$ 13%, $Na_2O$ 14%, $K_2O$<1%, MgO 2%, CaO<1%

Comparative Example 1

A chemically strengthened glass was produced in the same manner as in Example 1, except that the sodium amount in the molten salt in the chemical strengthening step was changed to a value shown in Table 1, that the addition amount of potassium carbonate was changed to 0 g, and that the acid treatment step and the alkali treatment step were omitted.

Comparative Example 2

A chemically strengthened glass was produced in the same manner as in Example 2, except that the sodium amount in the molten salt in the chemical strengthening step was changed to a value shown in Table 1, that the addition amount of potassium carbonate was changed to 0 g, and that the acid treatment step and the alkali treatment step were omitted.

Comparative Example 3

A chemically strengthened glass was produced in the same manner as in Example 3, except that the sodium amount in the molten salt in the chemical strengthening step was changed to a value shown in Table 1, that the addition amount of potassium carbonate was changed to 0 g, and that the acid treatment step and the alkali treatment step were omitted.

The thus-obtained chemically strengthened glass was evaluated for various properties. The results are shown in Table 1.

FIG. 3 to FIG. 5 show graphs in which the hydrogen concentration profile in the surface layer of each chemically strengthened glass obtained in Examples 1 to 4 and Comparative Examples 1 to 3 was plotted.

Figure 8:
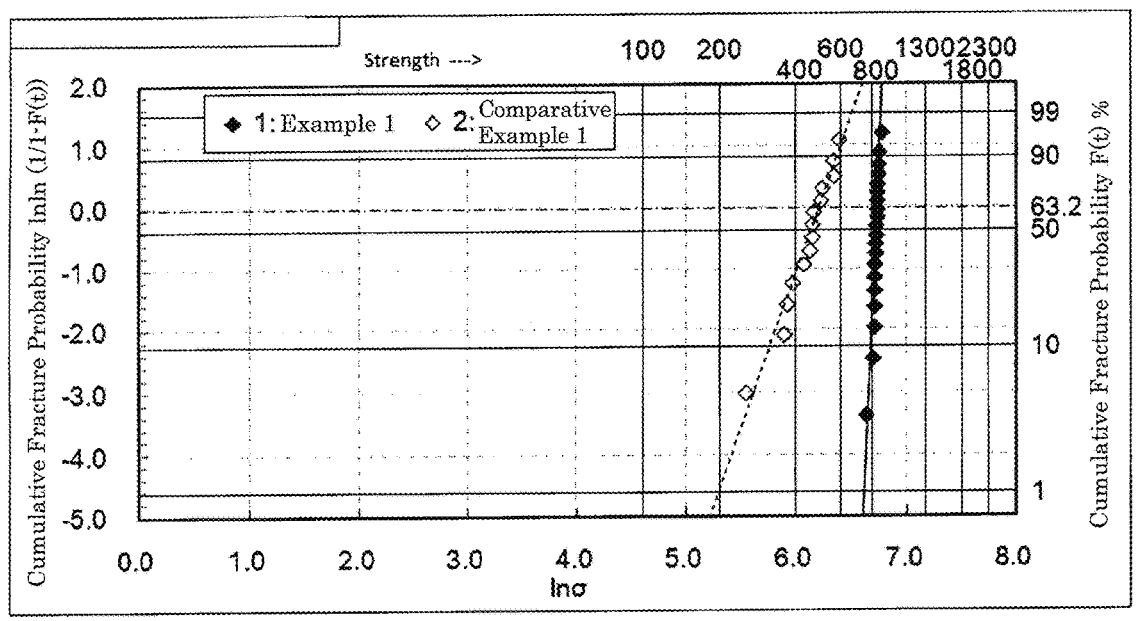
FIG. 8 is a Weibull plot of BOR surface strength evaluation of each of chemically strengthened glasses obtained in Example 1 and Comparative Example 1.

Further, FIG. 8 shows a Weibull plot of BOR surface strength evaluation of each of chemically strengthened glasses obtained in Example 1 and Comparative Example 1. FIG. 8 shows a Weibull plot of BOR surface strength evaluation of an aluminosilicate glass sheet sample having a thickness of 0.56 mm. The horizontal axis of the graph indicates a logarithm ln (σ) of the fracture load σ (N), and the vertical axis thereof indicates a cumulative fracture probability percentage P (%) relative to the sample in each of the two groups.

TABLE 1

| | | | Example 1 | Example 2 | Example 3 | Example 4 | Comparative Example 1 |
|---|---|---|---|---|---|---|---|
| | Type of Glass | | aluminosilicate glass A | aluminosilicate glass A | aluminosilicate glass B | Aluminoboro-silicate glass | aluminosilicate glass A |
| Chemical strengthening | $K_2CO_3$ | mol % | 6 | 6 | 6 | 6 | 0 |
| | Na content | wt ppm | 10,000 | 4,000 | 10,000 | 10,000 | 4,000 |
| | Temperature | ° C. | 450 | 430 | 450 | 450 | 450 |
| | Time | min | 120 | 40 | 120 | 120 | 120 |
| Acid treatment | Chemical liquid | type | HCl | HCl | $HNO_3$ | $HNO_3$ | — |
| | Concentration | wt % | 13.4 | 13.4 | 6 | 6 | — |
| | Temperature | ° C. | 41 | 41 | 41 | 41 | — |
| | Time | sec | 180 | 277 | 120 | 120 | — |
| Alkali treatment | Chemical liquid | type | NaOH | NaOH | NaOH | NaOH | — |
| | Concentration | wt % | 4 | 4 | 4 | 4 | — |
| | Temperature | ° C. | 40 | 40 | 40 | 40 | — |
| | Time | sec | 120 | 277 | 120 | 120 | — |

TABLE 1-continued

| | | | | | | | |
|---|---|---|---|---|---|---|---|
| Sheet thickness | | mm | 0.56 | 0.71 | 0.72 | 0.70 | 0.56 |
| Sheet strength | | N | 871 | 1101 | 1362 | 1053 | 455 |
| | | X: F > Xt$^2$ | 2777 | 2165 | 2650 | 2179 | 1432 |
| Surface removal amount | | nm | 154 | 50 | 159 | 186 | — |
| Surface roughness | n = 1 | nm | 0.33 | 0.33 | 0.24 | 0.46 | 0.19 |
| | n = 2 | nm | 0.39 | 0.31 | 0.24 | 0.46 | 0.17 |
| Expression (I) | a | | −0.159 | −0.268 | −0.099 | −0.198 | −0.295 |
| | b | | 0.138 | 0.202 | 0.133 | 0.153 | 0.311 |
| Average hydrogen concentration | c | mol/L (as H$_2$O) | 0.099 | 0.135 | 0.109 | 0.103 | 0.238 |
| CS | | MPa | 666 | 759 | 881 | 756 | 707 |
| DOL | | μm | 39 | 22 | 28 | 35 | 45 |
| Polishing flaws | | | Absent | Absent | Absent | Absent | Absent |

| | | | Comparative Example 2 | Comparative Example 3 | Reference Example 1 |
|---|---|---|---|---|---|
| Type of Glass | | | aluminosilicate glass A | Aluminoboro-silicate glass | aluminosilicate glass B |
| Chemical strengthening | K$_2$CO$_3$ | mol % | 0 | 0 | 0 |
| | Na content | wt ppm | 4,000 | 2,000 | 2,000 |
| | Temperature | °C. | 430 | 450 | 450 |
| | Time | min | 40 | 120 | 120 |
| Acid treatment | Chemical liquid | type | — | — | — |
| | Concentration | wt % | — | — | — |
| | Temperature | °C. | — | — | — |
| | Time | sec | — | — | — |
| Alkali treatment | Chemical liquid | type | — | — | — |
| | Concentration | wt % | — | — | — |
| | Temperature | °C. | — | — | — |
| | Time | sec | — | — | — |
| Sheet thickness | | mm | 0.72 | 0.68 | 0.70 |
| Sheet strength | | N | 687 | 413 | 564 |
| | | X: F > Xt$^2$ | 1333 | 858 | 1151 |
| Surface removal amount | | nm | — | — | — |
| Surface roughness | n = 1 | nm | 0.19 | 0.19 | 0.44 |
| | n = 2 | nm | 0.19 | 0.17 | 0.49 |
| Expression (I) | a | | −0.219 | −0.274 | −0.305 |
| | b | | 0.181 | 0.229 | 0.148 |
| Average hydrogen concentration | c | mol/L (as H$_2$O) | 0.128 | 0.161 | 0.073 |
| CS | | MPa | 679 | 779 | 949 |
| DOL | | μm | 20 | 37 | 27 |
| Polishing flaws | | | Absent | Absent | Present |

The results given in Table 1 show that Examples 1 to 4, which had a surface roughness (Ra) of 0.20 nm or higher and satisfied relational expression (I), were greatly improved in the surface strength as compared to Comparative Examples 1 to 3.

The results given in FIG. 8 show that the average fracture load of Example 1 was 827 N, whereas that of Comparative Example 1 was 455 N. The 10% fracture load (B10) of Example 1 was 793 N, whereas that of Comparative Example 1 was 318 N. The 1% fracture load (B1) of Example 1 was 750 N, whereas that of Comparative Example 1 was 200 N. It can be seen from these results that Example 1 does not produce low-strength products, and the products obtained have greatly improved reliability for the surface strength.

Reference Example 1

Figure 9:
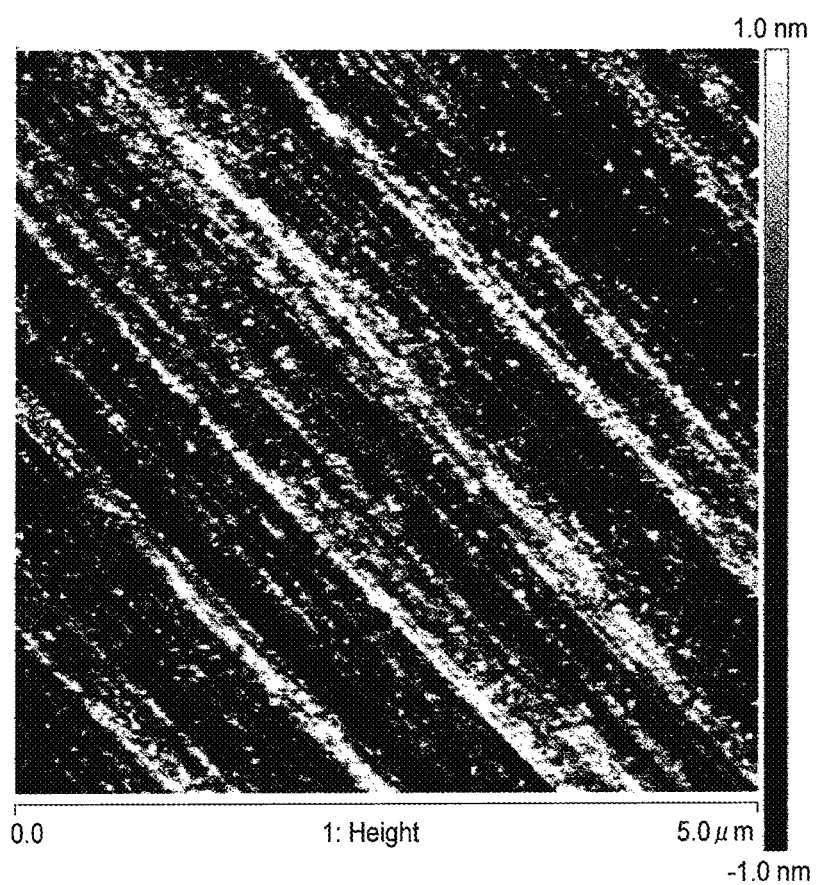
FIG. 9 is an AFM image of the chemically strengthened glass surface of Reference Example 1. The scanning area was 5×5 $\mu m^2$.

Cerium oxide having an average particle diameter of 1.2 μm was dispersed in water to produce a slurry having a specific gravity of 0.9. The same aluminosilicate glass B as in Example 3 was polished therewith in an amount of 0.6 μm per surface using a polishing pad (nonwoven fabric type) under a polishing pressure of 10 kPa. The glass obtained through the polishing step was chemically strengthened using the same molten salt as in Comparative Example 3 at a chemical strengthening temperature of 450° C. for a chemical strengthening treatment time of 2 hours. This chemically strengthened glass was evaluated for various properties, and the results thereof are shown in Table 1. An image obtained by observing a surface of this glass with an AFM is shown in FIG. 9. The surface roughness (Ra) thereof measured by the AFM measurement was 0.40 nm.

Figure 10:
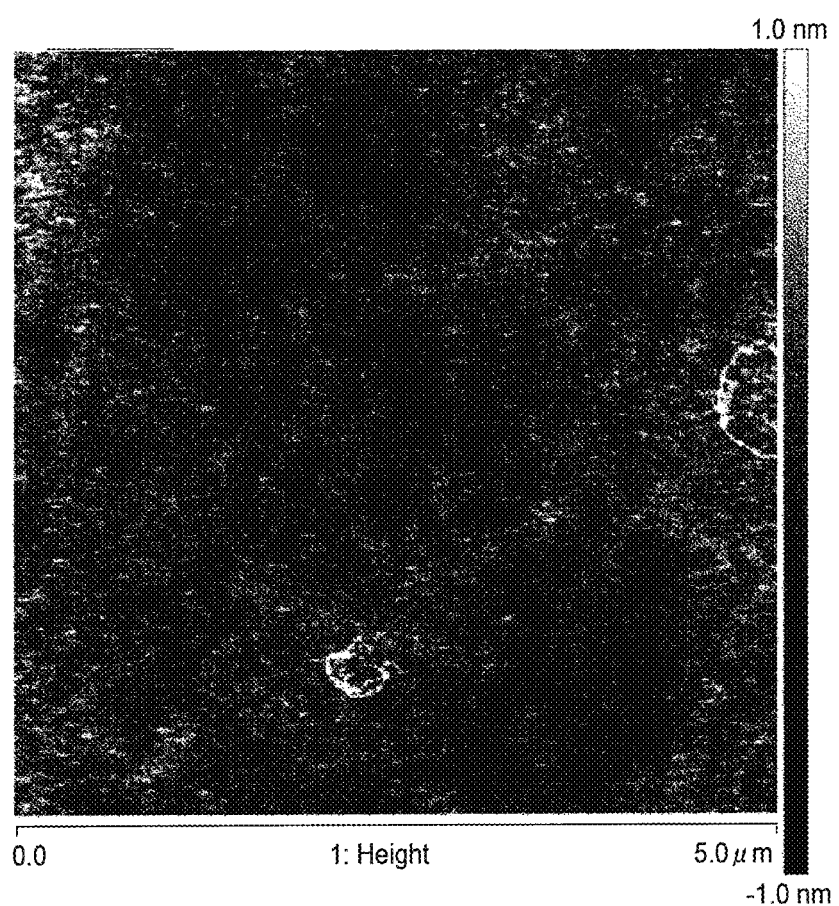
FIG. 10 is an AFM image of the chemically strengthened glass surface of Example 1. The scanning area was 5×5 $\mu m^2$.

Meanwhile, a surface observation image of the chemically strengthened glass produced in Example 1 is shown in FIG. 10. The surface roughness (Ra) thereof measured by the AFM measurement was 0.33 nm.

Reference Example 2

The same aluminosilicate glass B as in Example 3 was chemically strengthened using the same molten salt as in Comparative Example 3 at a chemical strengthening treatment temperature of 450° C. for a chemical strengthening treatment time of 2 hours. The glass which had been chemically strengthened was etched in an amount of 1.06 μm per surface by immersing the glass in a 25° C. solution composed of hydrofluoric acid having a concentration of 1.0 wt % and hydrochloric acid having a concentration of 18.5 wt % for 60 seconds.

Figure 11:
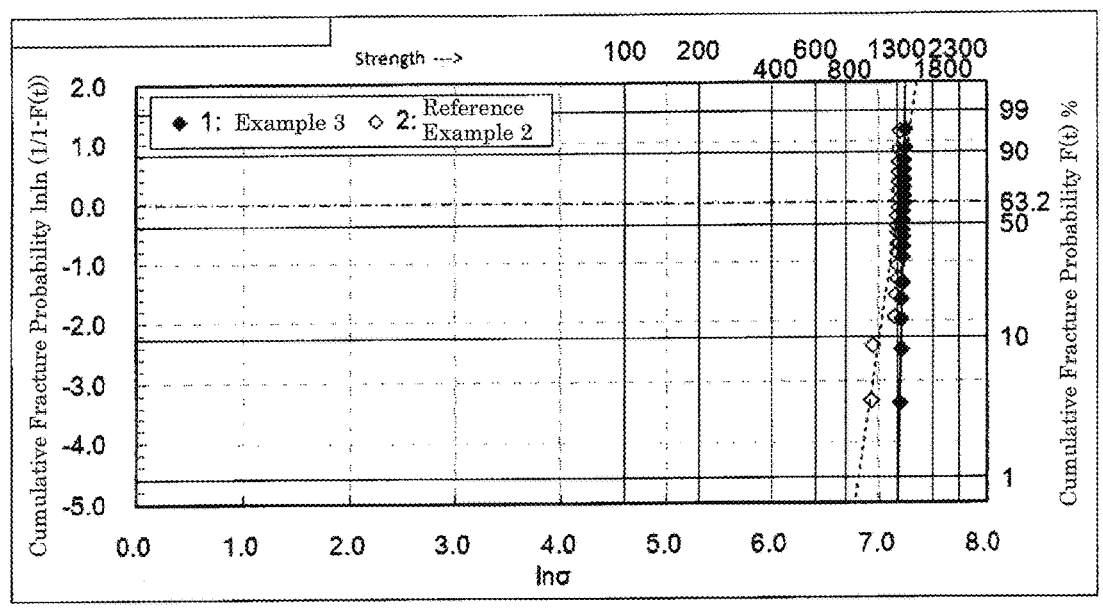
FIG. 11 is a Weibull plot of BOR surface strength evaluation of each of chemically strengthened glasses obtained in Example 3 and Reference Example 2.

FIG. 11 shows Weibull plots of the BOR surface strength evaluation of the chemically strengthened glasses obtained in Reference Example 2 and Example 3. The average fracture load of Example 3 was 1,362 N, whereas that of Reference Example 2 was 1,266 N. The 10% fracture load (B10) of Example 3 was 1,339 N, whereas that of Reference Example 2 was 1,098 N. The 1% fracture load (B1) of Example 3 was 1,307 N, whereas that of Reference Example 2 was 904 N. It can be seen from these results that Example 3 does not produce low-strength products, and the products obtained have greatly improved reliability for the surface strength.

Figure 12:
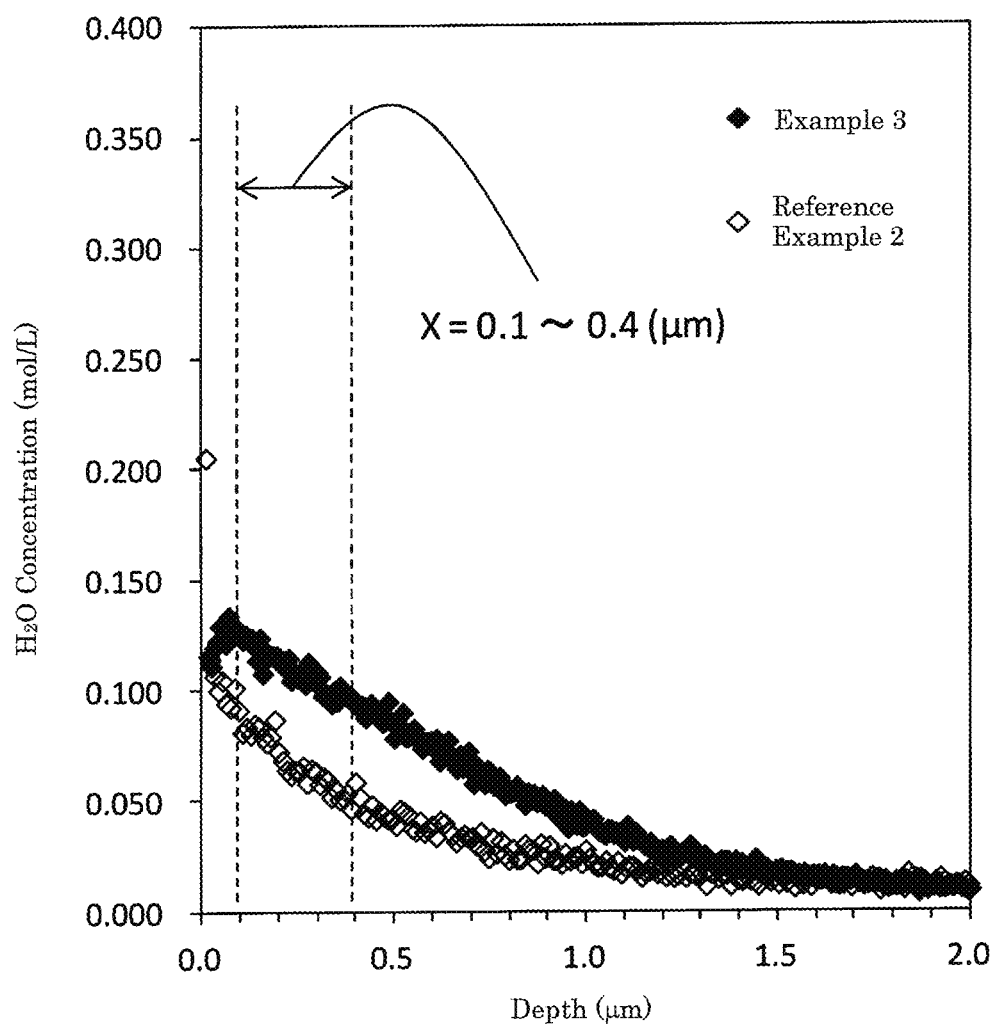
FIG. 12 is a graph of plotting the hydrogen concentration profile in the surface layer of each chemically strengthened glass obtained in Example 3 and Reference Example 2.

Furthermore, FIG. 12 shows the hydrogen concentration profiles of surface layers of the chemically strengthened glasses obtained in Reference Example 2 and Example 3. Example 3 was higher in surface-layer hydrogen concentration than Reference Example 2. The average hydrogen concentration c of the near-surface region (depth X from the outermost surface was 0.1 to 0.4 μm) in Reference Example 2 was lower than the average hydrogen concentrations c in Examples 1 to 4. It is hence presumed that the improvement in reliability for surface strength is due to the slightly high hydrogen (moisture) concentration in the vicinity of the glass surface layer, although the reason therefor in uncertain.

While the present invention has been described in detail and with reference to specific embodiments thereof, it will be apparent to one skilled in the art that various changes and modifications can be made therein without departing from the spirit and scope thereof.

INDUSTRIAL APPLICABILITY

According to the present invention, a chemically strengthened glass whose surface strength has been dramatically improved can be obtained safely and inexpensively. The chemically strengthened glass of the present invention is usable as a cover glass for displays such as mobile phones, digital cameras, and touch panel displays.

DESCRIPTION OF REFERENCE NUMERALS AND SIGNS

10: Low-density layer
20: Compressive stress layer
30: Interlayer

The invention claimed is:

1. A glass sheet, having a compressive stress layer formed in a surface layer of the glass sheet according to an ion exchange method,
   wherein the glass sheet has a surface roughness (Ra) of 0.20 nm or higher,
   two or more scratches each having a length of 5 μm or more and a width of 0.1 μm or more are not present in a region of 10 μm×5 μm of the surface of the glass sheet,
   an average hydrogen concentration, at a depth from the surface of the glass sheet of from 0.1 μm to 0.4 μm, is in a range from 0.070 to 0.150 mol/L, and
   a hydrogen concentration Y in a region to a depth X from a surface of the glass sheet satisfies relational equation (I) at X=from 0.1 to 0.4 (μm):

$$Y=aX+b \quad (I)$$

wherein:
   Y is the hydrogen concentration measured as $H_2O$ (mol/L);
   X is the depth from the surface of the glass sheet (μm);
   a is in a range from −0.210 to −0.050; and
   b is in a range from 0.020 to 0.220.

2. The glass sheet according to claim 1, wherein the glass is made of an aluminosilicate glass or an aluminoborosilicate glass.

3. The glass sheet according to claim 1, wherein a thickness of the glass sheet is 5 mm or less.

4. The glass sheet according to claim 1, wherein a thickness of the glass sheet is 3 mm or less.

5. The glass sheet according to claim 1, wherein in the relational equation (I), b is in a range from 0.020 to 0.215.

6. The glass sheet according to claim 1, wherein in the relational equation (I), b is in a range from 0.030 to 0.210.

7. The glass sheet according to claim 1, wherein in the relational equation (I), b is in a range from 0.040 to 0.200.

8. The glass sheet according to claim 1, wherein the glass sheet is made of an aluminosilicate glass.

9. The glass sheet according to claim 1, wherein the glass sheet is not etched by hydrofluoric acid.

10. A cover glass of a display, comprising the glass sheet according to claim 1.

11. The glass sheet according to claim 1, wherein the glass sheet is obtained by a process comprising:
   immersing a glass sheet in a molten salt comprising potassium nitrate to ion-exchange the glass sheet;
   immersing the ion-exchanged glass sheet in an acid solution to subject the glass sheet to an acid treatment; and
   immersing the glass sheet subjected to the acid treatment in a basic solution.

12. The glass sheet according to claim 11, wherein the molten salt further comprises at least one fusing agent selected from the group consisting of $K_2CO_3$, $Na_2CO_3$, $KHCO_3$, $NaHCO_3$, $K_3PO_4$, $Na_3PO_4$, $K_2SO_4$, $Na_2SO_4$, KOH and NaOH.

13. The glass sheet according to claim 11 wherein an Na concentration in the molten salt is 500 ppm or more.

14. The glass sheet according to claim 11, wherein an Na concentration in the molten salt is 1,000 ppm or more.

15. The glass sheet according to claim 14, wherein the acid solution comprises at least one acid selected from the group consisting of hydrochloric acid, sulfuric acid, phosphoric acid, acetic acid, oxalic acid, carbonic acid, and citric acid.

16. The glass sheet according to claim 14, wherein the basic solution comprises at least one base selected from the group consisting of sodium hydroxide, potassium hydroxide, potassium carbonate, and sodium carbonate.

* * * * *